United States Patent [19]

Szlam et al.

[11] Patent Number: 5,070,525
[45] Date of Patent: Dec. 3, 1991

[54] METHOD FOR AVOIDING CALL BLOCKING

[75] Inventors: Aleksander Szlam, Norcross; James W. Crooks, Jr., Marietta; Charles L. Warner, II, Stone Mountain, all of Ga.

[73] Assignee: Inventions, Inc., Norcross, Ga.

[21] Appl. No.: 478,619

[22] Filed: Feb. 12, 1990

[51] Int. Cl.⁵ .................. H04M 15/10; H04M 9/00
[52] U.S. Cl. ............................. 379/196; 379/197; 379/133; 379/221; 379/92
[58] Field of Search ............ 379/199, 196, 197, 198, 379/188, 142, 201, 221, 245, 246, 249, 92, 355, 100, 95, 88, 127, 133, 134, 140

[56] References Cited

U.S. PATENT DOCUMENTS

| | | | |
|---|---|---|---|
| 4,797,911 | 1/1989 | Szlam et al. | 379/92 X |
| 4,894,857 | 1/1990 | Szlam et al. | 379/67 |

Primary Examiner—James L. Dwyer
Attorney, Agent, or Firm—Jones, Askew & Lunsford

[57] ABSTRACT

Methods for avoiding a call blocking feature. In a first method a list is kept for the trunks previously used to call a particular telephone number. Each time that particular telephone number is called a different trunk, not on that list, is used to place the call. The list is cleared and restarted whenever all the trunks have been used. In a second method a list is kept for trunks for which a call blocking message has been received when an attempt was made to call that telephone number. Each time that particular telephone number is called a trunk which is not on that list is used to place the call. Only non-blocked trunks are used to call a telephone number.

62 Claims, 4 Drawing Sheets

Fig — 1

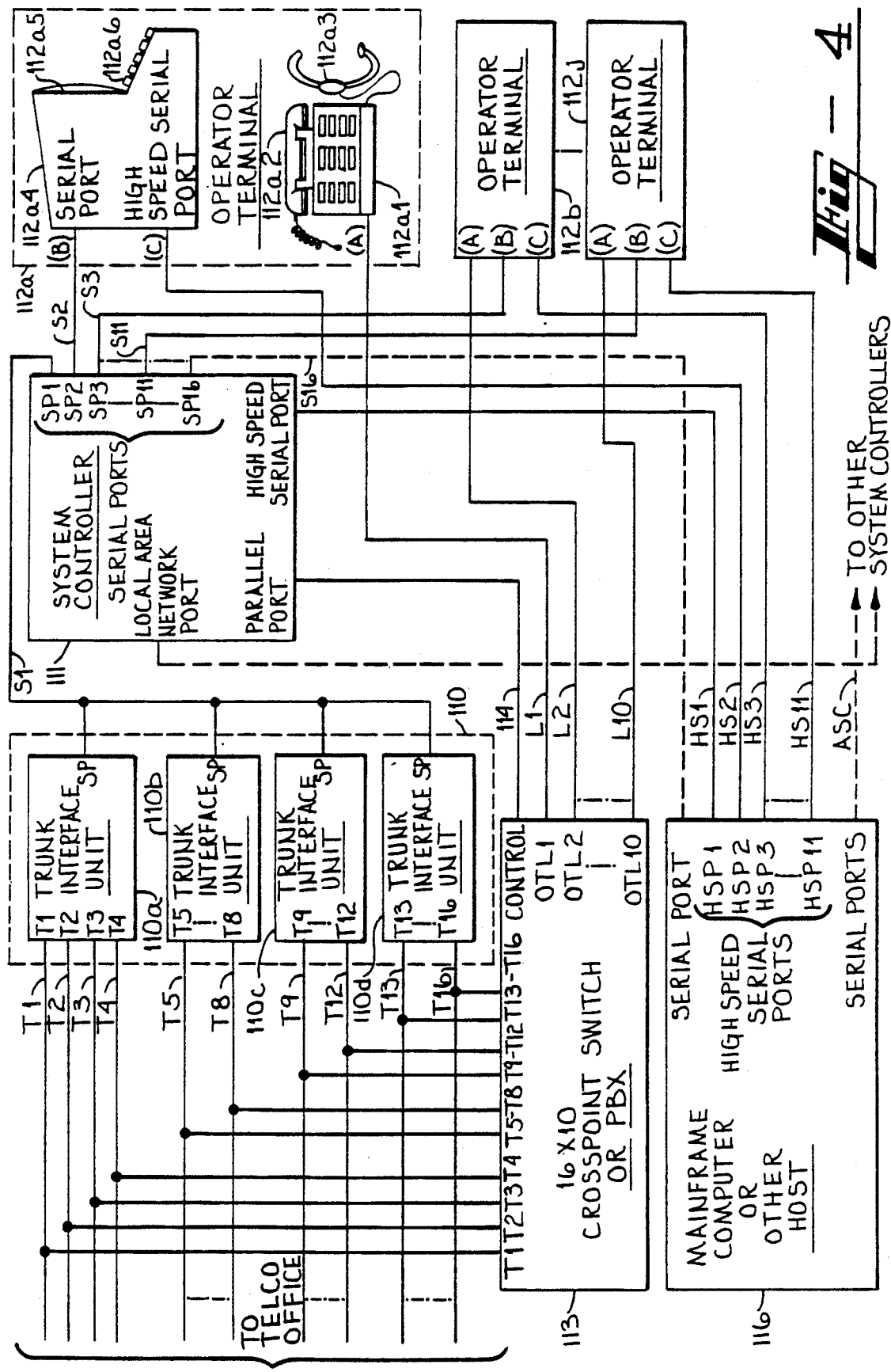

METHOD FOR AVOIDING CALL BLOCKING

TECHNICAL FIELD

The present invention relates to automated telephone call dialing systems and, more particularly, to methods for avoiding a call blocking feature.

BACKGROUND OF THE INVENTION

Automated telephone call dialing systems are being used to an increasingly greater extent by commercial and charitable telephone marketing organizations and by collection agencies. In a typical automated telephone call dialing system a telephone number is obtained from the customer (or potential customer) account records, a trunk is seized, the telephone number is dialed on the trunk and, when the call is answered, an operator is connected to the trunk. The use of automated dialing substantially increases operator productivity by eliminating the need for the operator to look up and dial the telephone number.

Recently, telephone companies in certain areas have begun offering a call blocking feature to the telephone subscriber. One aspect of the call blocking feature allows the telephone subscriber to key in a telephone number from which the subscriber does not wish to receive calls. Another aspect of the call blocking feature allows the telephone subscriber, after receiving a call, to key in a code indicating that the subscriber wishes calls from that number to be blocked. Some telephone subscribers, almost as a reflex action, key in the code to activate the call blocking feature anytime that the subscriber receives a call from a telephone marketing service or a collection agency. A party who uses a trunk to call a telephone number will hear a telephone company recording indicating that call blocking has been activated if the telephone subscriber has activated call blocking with respect to that trunk.

Telephone marketing services and collection agencies typically have a large bank of trunks which they use in conjunction with the automated call dialing system. Therefore, even if one or more trunks have been blocked with respect to a particular telephone number by the telephone subscriber there are other trunks which have not been blocked and which can be used to call the telephone number. The telephone company typically only allows the subscriber to block a certain number of trunks. Therefore, the telephone marketing service or the collection agency will, in the end, be able to reach the subscriber if the telephone marketing service or collection agency has a larger number of trunks than the telephone company permits the subscriber to block.

In a typical automated call dialing system a call is placed by dialing the telephone number on the first trunk which becomes available. Because of the random nature of the length of any particular call a trunk, on occasion, may be repeatedly used to call the same telephone number. In this case, the operator would repeatedly hear the call blocking message.

Therefore, there is a need for a method of selecting trunk lines to place automated calls so as to reduce or eliminate the number of times that a telephone number is called on a trunk line for which the telephone subscriber has activated the call blocking feature.

In automated call dialing it is desirable, and sometimes required by law, to have an operator available to handle the call, when the call is answered, as opposed to placing the called party on hold or playing a recorded message to the called party. Call pacing algorithms regulate the rate at which calls are placed in response to statistics on the time between dialing and answering, the length of conversations, and the number of operators available. However, a call pacing algorithm is an estimate and conditions may occur which invalidate the estimate and can cause a call to be answered when an operator is not available. It would be preferable for the call to be cancelled if current projections indicate that the call will be answered before an operator is available.

Therefore, there is a need for monitoring the call pacing projections and cancelling calls which may be answered before an operator is available.

SUMMARY OF THE INVENTION

The present invention provides methods for avoiding the call blocking feature. In one form of the present invention, a list of trunks which have previously been used to call a telephone number is maintained. Each time that the telephone number is to be called this list is inspected and a trunk which is not the list is used to place the call. Therefore, once a particular trunk has been used to call a particular telephone number that particular trunk will not be used to call that particular telephone number again until all other trunks have been used to call that telephone number. Once all the trunks have been used to call that particular telephone number then the list is cleared and the process is started again. Therefore, a call will be placed on a trunk which has been blocked only once in every N times, where N is the number of trunks that are available for automated call dialing.

So as to maximize the benefit obtained from each trunk, a refinement of the present invention provides for adding a trunk to the list only if the call was answered. If the call was not answered, then that trunk is not added to the list and can be used to place the call to that telephone number at a later time.

In another form of the present invention the operator at the marketing or collection service enters an indication that call blocking was present if the operator hears the call blocking message. For each telephone number that is called, a list is maintained of the trunks on which call blocking was activated. Each time that a trunk becomes available and a telephone number is to be called, the list is inspected to determine if that trunk is blocked with respect to that telephone number. If not then the call is placed on that available trunk. However, if that available trunk appears upon the list then that trunk is not used to call the telephone number. Instead, the system delays calling that telephone number until a trunk becomes available which is not on the list of blocked trunks. The blocked trunk may be used to call another telephone.

In a refinement of this method, the marketing or collection service operator is notified if all trunks have been blocked. This allows the operator or supervisory personnel to determine whether the list should be cleared and the entire set of trunks tried again or whether that telephone number should be removed from the automated call dialing record.

Therefore, the present invention provides a method for avoiding the call blocking feature.

The present invention also provides a method for reducing the likelihood that a call will be answered before an operator is available. A projection of operator availability is made, based upon current operating conditions. A projection of the time between dialing and answering is also made, or a programmed number is used. If an operator is not projected to be available before the call is projected to be answered then the call is cancelled. Also, if the call is answered before an operator actually becomes available then the call is cancelled (the system hangs up on the call by releasing the trunk).

Therefore, the present invention provides a method for monitoring call pacing projections and cancelling calls which are, or may be, answered before an operator is available.

DETAILED DESCRIPTION

FIG. 4 is a block diagram of the preferred environment of the present invention.

In the preferred embodiment, the method of the present invention is implemented by a computer-based system which performs automated telephone call dialing. An example of a system which performs automated telephone call dialing, in addition to handling incoming calls and performing online updates of customer account records, is described in U.S. Pat. No. 4,797,911 issued Jan. 10, 1989, and U.S. Pat. No. 4,894,857 issued Jan. 16, 1990, both of which are assigned to the assignee of the present invention, and both of which are hereby incorporated herein by reference. The systems described in the above patents have a plurality of trunk lines and a plurality of operator terminals. The number of trunks generally exceeds the number of operators so that a new telephone number is being dialed even while all the operators are occupied so that, when an operator becomes available, the call can be immediately transferred to the operator and the unproductive time of the operator minimized. In the context of telephone marketing and collections, each telephone number will typically be associated with a customer or potential customer name, address, account number if appropriate, billing and/or credit information, etc. The telephone number is therefore part of a record, such as a customer account record, which is one of many records stored in a database. When a telephone number is to be called all or a part of the record containing that telephone number will be read from the database and then the telephone number and other appropriate information will be extracted from the record for purposes of automated call dialing.

Figure 1:
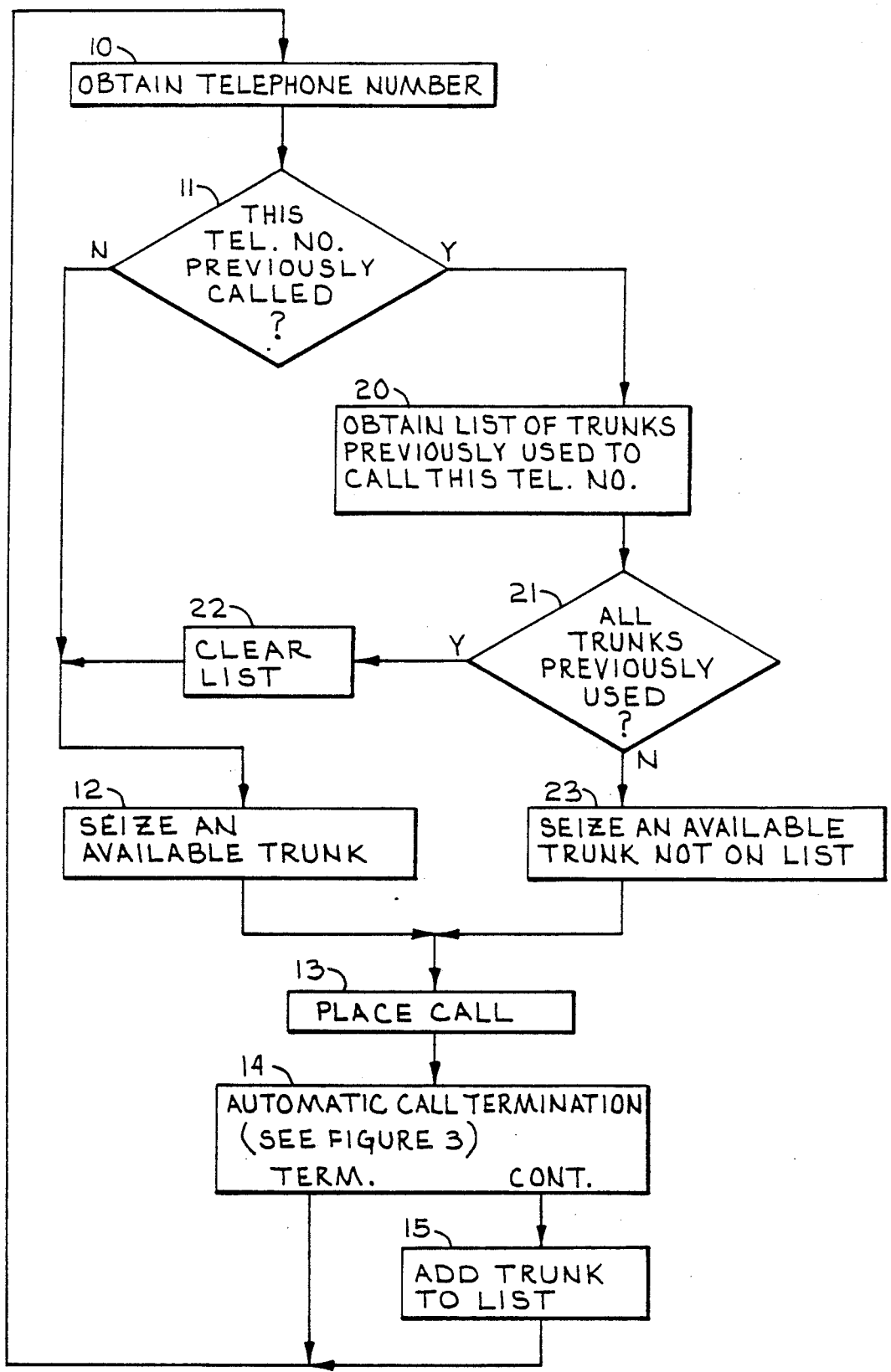
FIG. 1 is a flow chart of one method of implementing the present invention.

Turn now to FIG. 1 which is a flow chart of one method of implementing the present invention. This method avoids the call blocking feature by using a different trunk each time that the telephone number is called. Even if the called party activates the call blocking feature with respect to one or more trunks the other trunks, which are not blocked, can be used to place the call to the telephone number. Therefore, in step 10 the telephone number is obtained. This is preferably accomplished by reading the record associated with that telephone number from the database and extracting the telephone number. Decision 11 queries whether this telephone number has previously been called. This information may be contained as a list in the record associated with the telephone number or may be contained in a separate table containing lists of numbers previously called. If the telephone number has not been previously called then, in step 12, an available trunk is seized and, in step 13, the call is placed by dialing the telephone number on the available trunk which has been seized. Process 14 determines whether the call is allowed to continue or is terminated. Automatic call termination process 14 is described in conjunction with FIG. 3. If the call is terminated, then a return is made to step 10 to obtain the next telephone number to be called. However, if the call is allowed to continue to completion then, in step 15, the trunk which was used to place the call is added to the list of trunks which have been used to call this telephone number.

If, in decision 11, it is determined that the telephone number has previously been called then, in step 20, a list of trunks previously used to call this telephone number is obtained. In decision 21 this list is inspected to determine if all of the trunks have previously been used. If so then the list is cleared in step 22 and then steps 12-15 are executed. However, if all the trunks have not previously been used then, in step 23, an available trunk which is not on the list is seized. Steps 13-15 are then executed.

It will be seen from the above that once a trunk is used to call a telephone number that trunk is not used again to call that telephone number until all trunks have been used to call that telephone number. It is preferred that a trunk not be added to the list of trunks previously used to call the telephone number unless the call was actually completed. However, if desired, the TERM output of process 14 could also proceed to step 15, so that the trunk is added to the list regardless of whether or not the call was completed.

In step 23 any available trunk not on the list may be seized. However, step 23 should be understood as encompassing a predetermined trunk section scheme, such as taking the trunks in order 1, 2, . . . N, or in some other predetermined order.

Likewise, step 12 should be understood as encompassing the seizing of the first available trunk, the seizing of the lowest (or highest) numbered trunk, etc.

Figure 2:
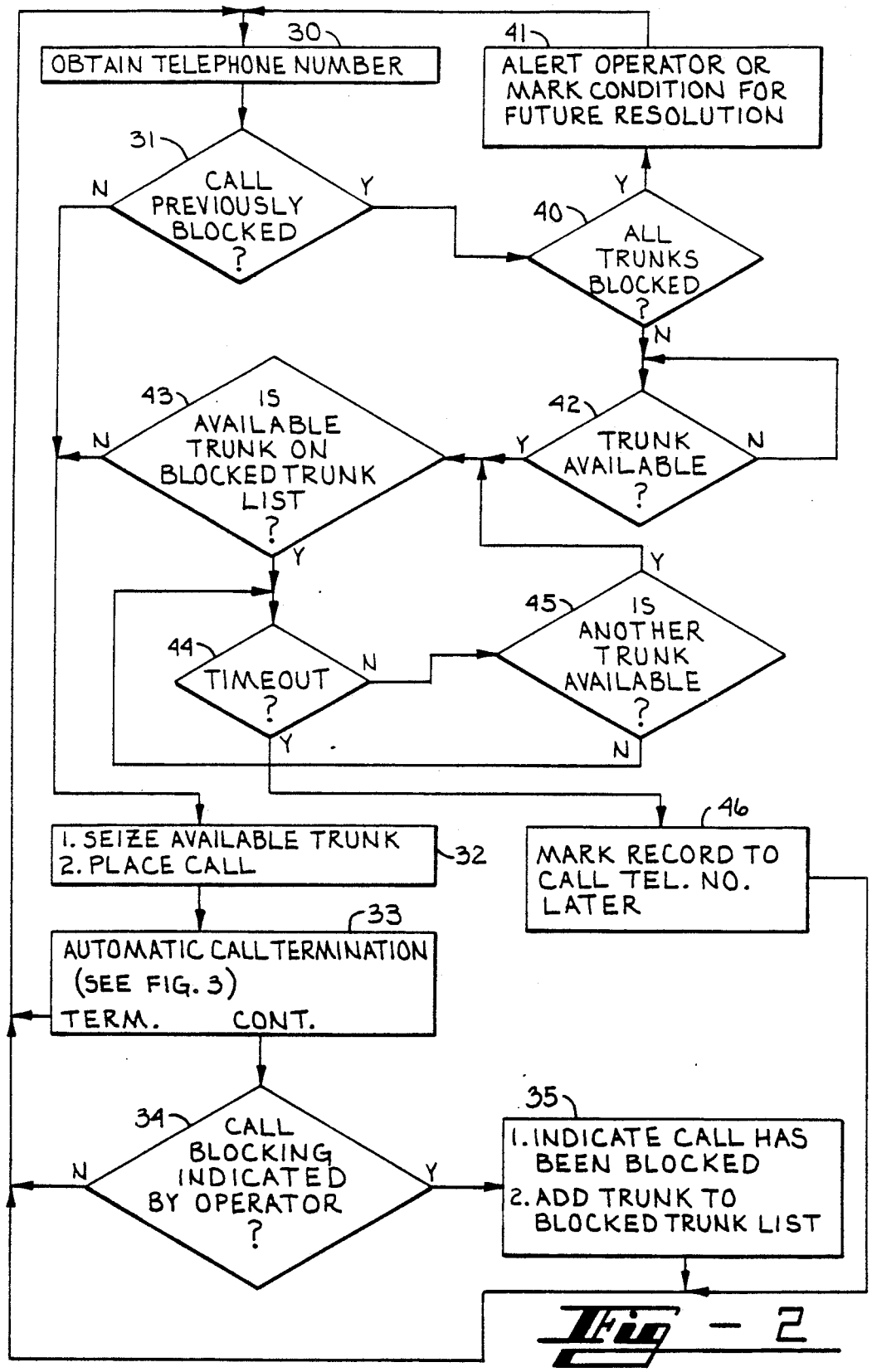
FIG. 2 is a flow chart of another method of implementing the present invention.

FIG. 2 is a flow chart of another method of implementing the present invention. In step 30 the telephone number is obtained. Decision 31 determines whether the call has previously been blocked. There may be a field in the record which indicates whether the call has been previously blocked or a separate listing of calls which have been previously blocked may be maintained. If calls to that telephone number have not been previously blocked then, in step 32, an available trunk is seized and the call to that telephone number is placed. Automatic call termination process 33 determines whether the call should be terminated or allowed to continue through completion. If the call was terminated then a return is made to step 30 and another telephone number is obtained. If the call is allowed to continue then, if the operator hears a call blocking message, the operator keys in an entry or code or presses a key, which indicates that a call blocking message has been received. Decision 34 therefore determines whether call blocking has been indicated by the operator. If not, then a return is made to step 30. However, if call blocking has been indicated then, in step 35, the record is updated to indicate that the call has been blocked and the trunk on which the call was made is added to a blocked trunk list. The blocked trunk list, which is preferably part of the record containing the telephone number, is a list of the trunks which have been blocked when that telephone number was called. A trunk may be blocked with respect to one telephone number but not with respect to another telephone number. Therefore, a separate blocked trunk list is kept for each telephone number.

If, in decision 31, a determination has been made that a call to the telephone number has previously been blocked then decision 40 determines whether all trunks have been blocked. If so then step 41 alerts the operator that all trunks have been blocked. It is not necessary that the operator be immediately alerted. It may be preferable that the operator be alerted at the conclusion of a calling session or that the "all trunks blocked" condition be logged into a "problems" log for future resolution. The operator or other supervisory personnel can then determine whether the list of blocked trunks should be cleared and the process repeated, whether that account should be placed in an inactive account file for a short period and then retrieved so that, in the interim period, the called party may have deactivated the call blocking feature for one or more of the trunks, or whether other action should be taken with respect to that account.

If decision 40 determines that not all of the trunks have been blocked, then decision 42 determines whether there is a trunk presently available for placing a call to that telephone number. If not then decision 42 is repeated until a trunk becomes available. When a trunk becomes available decision 43 determines whether the trunk is on the blocked trunk list for that telephone number. If not then, in step 32, the available trunk is seized and the call is placed, and then steps 33-35 are executed.

If the available trunk is on the blocked trunk list for that telephone number then decision 44 determines whether a timeout condition has occurred. If a timeout condition has not occurred then decision 45 determines whether another trunk is available. If so then decision 43 again tests whether this next available trunk is on the blocked trunk list. If the next available trunk is not on the blocked trunk list then steps 32-35 are executed. However, if the next available trunk is on the blocked trunk list, or if another trunk is not available, then decision 44 again tests for a timeout condition. If a timeout condition occurs then, in step 46, the record is marked that the telephone number should be called at a later time. Decision 44 prevents a decision 43-decision 45 perpetual loop condition from occurring.

It will be appreciated from the above that, in this method, if a call is made to a telephone number and that call is blocked then the trunk on which that call was made is placed on a blocked trunk list for that telephone number. Thereafter, when an attempt is made to call that telephone number, a trunk which is not on the blocked trunk list will be used.

Figure 3:
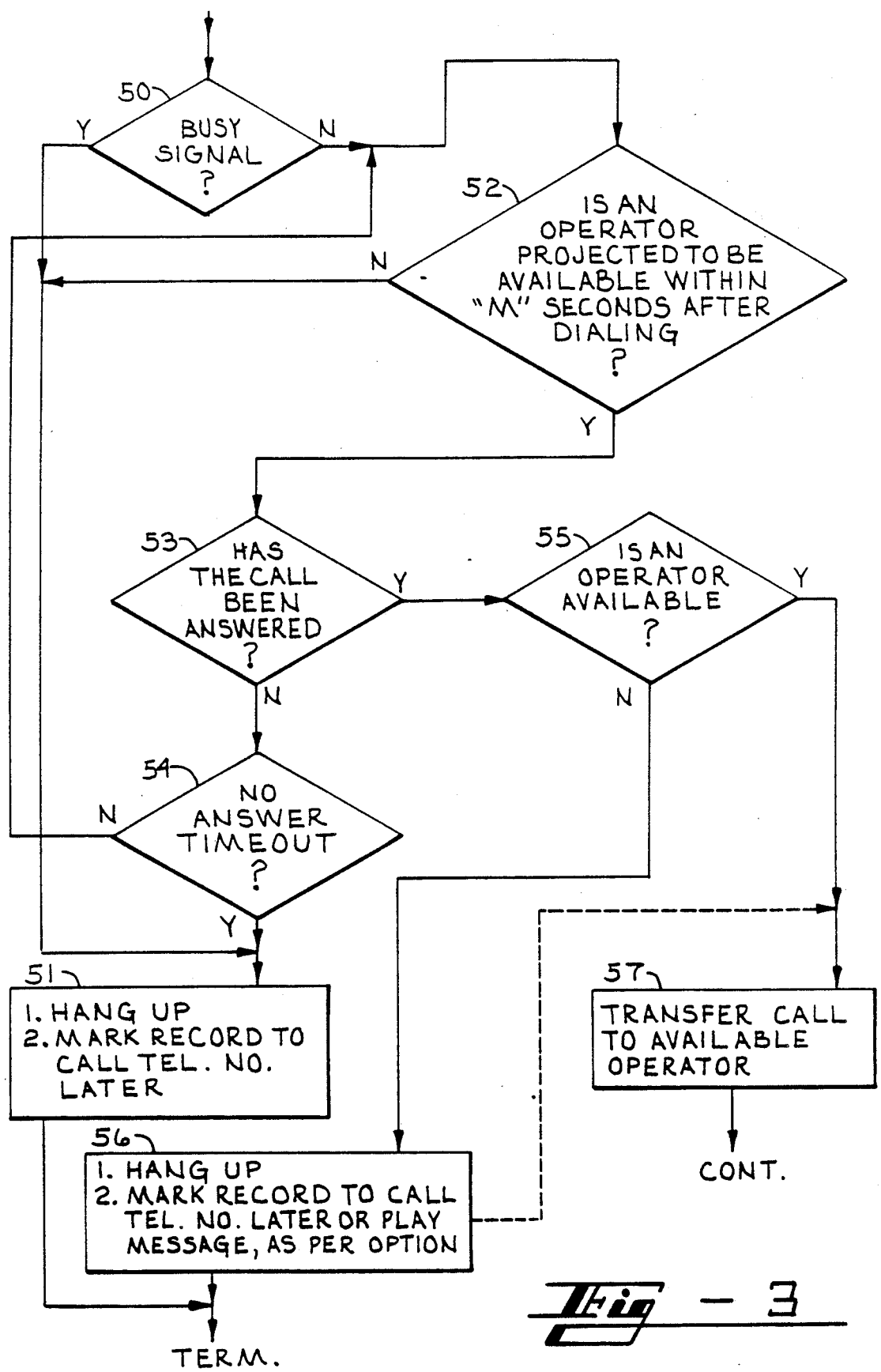
FIG. 3 is a flow chart of the automatic call termination feature of FIGS. 1 and 2.

Turn now to FIG. 3 which is a flow chart of the automatic call termination feature of FIGS. 1 and 2. In advanced automated call dialing systems, such as described in the above patents, a call pacing algorithm is used to determine the rate at which outbound calls are initiated so that, based on statistical data, a call will be answered as soon as or shortly after an operator becomes available so that the operator's time will be fully utilized and productive. However, it occasionally happens that, after calls have been placed and before they have been answered, conditions change and the operators spend more time on existing calls than originally anticipated. This can cause a situation wherein a call is answered but an operator is not available to handle the call. The automatic call termination process monitors the availability of an operator and terminates the call if an operator is not currently projected to be available by the time the call is answered. Once a call has been placed, such as in step 13 of FIG. 1 or step 32 of FIG. 2, decision 50 determines whether a busy signal is detected for the telephone number being called. If so then, in step 51, the trunk is released (hang up) and the record is marked to call that telephone number again later. Alternatively, if a busy signal is detected then step 56 may be executed. In step 56 the trunk is released and the record is marked to call the telephone number again in accordance with a programmed system option. The option may specify that the telephone number is to be called again immediately, within a predetermined time, after a predetermined time, such as five minutes, as soon as an operator becomes available, or as soon as an operator is projected to become available. The system may also have other programmable options. For example, a message, such as a "please hold" message or a statement as to why the party was called, may be played so that the called party does not hang up but remains connected until an operator becomes available. If an operator is still not available after a predetermined period then another message may be placed, asking the party to continue holding, or thanking the called party for holding and then terminating the call. The system may also play the same message or a series of different message a predetermined number of times, until an operator becomes available, or until the called party hangs up. Step 51 and, if the call is not transferred to an operator, Step 56 cause the call to be terminated (TERM).

If, in decision 50, a busy signal is not detected then decision 52 determines whether an operator is projected to be available within "M" seconds after the telephone number was dialed. The parameter M may be programmable, such as ten seconds, twenty seconds, etc., which may be obtained from statistics for a particular calling area, or may be a dynamic parameter which is adjusted based upon statistics for current operating conditions, such as the time between call initiation and call answering for previous calls, the duration of answered calls, etc. If an operator is not projected to be available then step 51 (or step 56) is executed. If an operator is projected to be available then decision 53 determines whether the call has been answered. If the call has not be answered then decision 54 determines whether a no answer timeout has occured. If a no answer timeout has not occurred then a return is made to decision 52. However, if a no answer timeout has occurred then step 51 (or step 56) is executed. It will be appreciated that the purpose of decision 54 is to terminate calls to telephone numbers where no one is home.

If, in decision 53, it is determined that the call has been answered then decision 55 determines whether an operator is currently available. If not then step 56 releases the trunk (hangup) and marks the record that the telephone number should be called in accordance with the programmed option. Alternatively, step 51 could be executed. If, in decision 55, an operator is available then, in step 57, the call is transferred to the available operator for handling. It will therefore be appreciated that step 57 indicates that the call has been continued (CONT).

It will be appreciated that, if the called telephone number is busy, or if the called party answers but an operator is not available, that telephone number should be given a priority status for recall because it has been established that the called party is available.

FIG. 4 is a block diagram of the preferred environment of the present invention. The preferred environment comprises four trunk interface units 110a-110d, a system controller 111, a cross-point switch or PBX 113, a mainframe computer or host 116, and ten operator terminals 112a-112j. Sixteen trunk lines T1-T16 are connected to composite trunk interface unit 10b and cross-point switch 113. Each trunk interface unit 110a-110d accommodates four trunk lines so that trunk interface unit 110a services trunks T1-T4, trunk interface unit 110b services trunks T5-T8, and so forth. Each trunk interface unit 110a-110d performs one or more of the following functions: trunk seizure; dialing; call progress monitoring; message playing; message recording; voice recognition and analysis; automatic number identification; and/or dual tone multifrequency tone decoding. A trunk interface unit, such as trunk interface unit 110a, preferably comprises a dialer, a call progress monitor, a message player and/or recorder, an incoming call detector, an automatic number identification (ANI) decoder, a dual tone, multifrequency (DTMF) decoder, a voice recognition module, and a trunk interface control unit. Details of the construction and operation of trunk interface units 110a-110d are explained in more detail in the referenced patents. The parallel port of system controller 111 is connected by parallel bus 114 to the control inputs of switch 113. It will also be appreciated that system controller 111 may control the operation of switch 113 through some other communication means or port, such as serial port SP15. The use of a serial port or a parallel port will, of course, be determined by the nature of the control input port of switch (or PBX) 113.

In the preferred environment, system controller 111 has 16 serial ports SP1-SP16, a parallel port, a high speed serial port, and a local area network port. Serial port SP1 of system controller 111 is connected to the serial ports (SP) of trunk interface units 110a-110d through a standard multi-line drop. Controller 111 may, of course, be connected to units 110a-110d through any appropriate communications means. Each trunk interface unit 110a-110d has an address different from any other trunk interface unit so that system controller 111 may, via port SP1 and trunk interface units 110a-110d, monitor the status of trunk lines T1-T16. System controller 111, via serial port SP1, also commands trunk interface units 110a-110d to perform a desired operation on a specified trunk T1-T16. For example, system controller 111 may command trunk interface unit 110a to seize trunk T1 and begin dialing a desired telephone number, command trunk interface unit 110a to begin playing a prerecorded message on trunk T2, and obtain information on the status of the trunks T1-T16. Also, the trunk interface units 10 may advise system controller 111 that a ringing signal (indicating an incoming call) is occurring on a particular trunk whereupon system controller 111 may command trunk interface units 10 to seize the trunk having the incoming call, play a prerecorded message on that trunk, and evaluate the calling party's response to the prerecorded message. In the preferred environment, serial port SP1 is an RS-232C serial data port.

Operator terminal 112a, which is respresentative of operator terminals 112b-112j, has a telephone set 112a1, a handset 112a2, and/or a headset 112a3. Typically, a headset 112a3. Typically, a headset 112a3, and not handset 112a2, will be plugged into telephone 112a1 so as to free the operator's hands. It will be appreciated that, in environments in which headset 112a is always used, handset 112a2 may be eliminated. It will also be appreciated that, if the operator has no need to manually place outgoing calls, telephone set 112a1 may be replaced by a conventional trunk line-to-headset interface.

Operator terminal 112a also has a data terminal 112a4, data terminal 112a4 having a display screen 112a5 and a keyboard 112a6. Data terminal 112a4 has a serial port (B) connected by coaxial cable, or other data transfer means, S2 to the SP2 serial port of system controller 111 and a high speed serial port (C) connected by a cable, or other data transfer means, HS2 to a high speed serial port of computer 116. Data terminal 112a4 may also have other types of ports for data transmission and retrieval, such as a telephone port for use by an internal modem (not shown) or a port for connection to an external modem (not shown). Operator terminals 112b-112j are likewise connected by conductors S3-S11 to SP3-SP11 serial ports of system controller 111 and cables HS3-HS12 to the high speed serial ports of host 116. Line outputs OTL1-OTL10 of switch 113 are connected by telephone lines L1-L10, respectively, to the telphone sets 112a1-112j1 via the telephone inputs (A) of operator terminals 112a-112a-112j, respectively. Although separate data cables (S2-S11, HS2-HS11) are shown for each data terminal it will be appreciated that all the (B) ports may be connected to one local area network serviced by, for example, cable S2, and that all the (C) ports may be connected to another LAN serviced by, for example, cable HS2 or cable HS1.

The high speed serial port of system controller 111 is connected by cable HS1 to a high speed serial port of mainframe computer (or other host) 116 to allow for file transfers and data manipulation. Alternatively, serial port SP16 of system controller 111 may be connected by cable S16 to a serial port of host 116 for this purpose. The local area network port of system controller 111 and the other serial ports of mainframe computer 116 may, be connected to other system controllers (not shown) via local area network cable LAN and additional serial cables ASC, respectively.

Batch mode transfer from computer 116 to system controller 111 is preferred but, if desired or required by the limitations of the applications software of mainframe computer 116, system controller 111 can obtain information from mainframe 116 one account at a time. Also, depending upon the previously installed program in host 116, system controller 111 may obtain full account information, abbreviated account information, or compilations of certain account information such as, for example, a calling list. System controller 111 coordinates and performs such functions as causing trunk interface units 10 to seize a trunk line, dial a customer telephone number, monitor the status of the outgoing call, detect an incoming call, answer an incoming call, play prerecorded messages and determine the response from the called/calling party, record a called/calling party's response, etc. These functions of system controller 111 and the manner in which they are implemented are described in in more detail in the referenced patents.

In the preferred environment, system controller 111 and each data terminal 112a4–112j4 is an IBM-AT, an IBM PS/2 Model 30, 60, or 80, or other computer programmed and equipped to emulate an operator terminal which is designed to interface with mainframe computer 116 via a high speed serial port or other communication means.

From the above it will be appreciated that the present invention is for use with an automated call dialing system, for avoiding a call blocking feature. Also described is an automatic call termination process which terminates outgoing calls if an operator is not projected to be available by the time that the call is answered. From the above, variations to and other embodiments of the present invention will suggest themselves to those of skill in the art. Therefore, the present invention is to be limited only by the claims below.

We claim:

1. For use with an automated call dialing system, a method for avoiding a call blocking feature, comprising the steps of:
   (a) obtaining a telephone number to be called;
   (b) inspecting a list of trunks which have previously been used to call said telephone number;
   (c) seizing a trunk which is not on said list; and
   (d) placing a call by dialing said telephone number on said trunk.

2. The method of claim 1 and further comprising, after step (a), the steps of:
   if said telephone number has been previously called then proceeding to step (b); and
   otherwise, seizing a trunk and proceeding to step (d).

3. The method of claim 1 wherein said system has a plurality of trunks and further comprising, after step (b), the steps of:
   if all trunks of said plurality of trunks are on said list then clearing said list, seizing a trunk, and proceeding to step (d); and
   otherwise, proceeding to step (c).

4. The method of claim 1 and further comprising the step of:
   (e) updating said list by adding said trunk to said list.

5. The method of claim 1 and further comprising the steps of:
   (e) if said call is answered then updating said list by adding said trunk to said list; and
   (f) otherwise returning to step (a).

6. The method of claim 1 and further comprising, after said call has been placed, the steps of:
   (e) if a busy signal is detected on said trunk then terminating said call;
   (f) if an operator is not projected to be available within a first predetermined time after said call was placed then terminating said call;
   (g) if said call has not been answered within a second predetermined time after said call was placed then terminating said call;
   (h) if said call is answered and an operator is not available then terminating said call; and
   (i) if said call is answered and an operator is available then connecting said call to said operator.

7. The method of claim 6 wherein steps (e), (f), and (g) further comprise marking a record to indicate that said telephone number is to be called again.

8. The method of claim 6 wherein step (h) further comprises marking a record to indicate that said telephone number is to be called again.

9. The method of claim 6 wherein step (h) further comprises marking a record to indicate that said telephone number is to be called again after a predetermined time.

10. The method of claim 6 wherein step (h) further comprises marking a record to indicate that said telephone number is to be called again as soon as an operator is available.

11. The method of claim 6 wherein step (h) further comprises marking a record to indicate that said telephone number is to be called again as soon as an operator is projected to become available.

12. The method of claim 6 wherein said first predetermined time is programmable.

13. The method of claim 6 wherein said second predetermined time is programmable.

14. The method of claim 6 wherein each said step of terminating said call comprises releasing said trunk.

15. The method of claim 6 and further comprising the step of dynamically adjusting said first predetermined time in response to current operating conditions.

16. The method of claim 6 and further comprising the step of dynamically adjusting said second predetermined time in response to current operating conditions.

17. For use with an automated call dialing system, a method for avoiding a call blocking feature, comprising the steps of:
   (a) obtaining a telephone number to be called and seizing a trunk of a plurality of trunks;
   (b) inspecting a record to determine if said call blocking feature has previously been encountered with respect to said telephone number;
   (c) if said call blocking feature has not previously been encountered with respect to said telephone number then placing a call by dialing said telephone number on said trunk;
   (d) if said call blocking feature has been previously encountered with respect to said telephone number then inspecting list of blocked trunks to determine if said call blocking feature has previously been encountered for said telephone number with respect to said trunk;
   (e) if said call blocking feature has not been previously encountered for said telephone number with respect to said trunk then placing a call by dialing said telephone number on said trunk; and
   (f) if said call blocking feature has previously been encountered for said telephone number with respect to said trunk then seizing another trunk and returning to step (d).

18. The method of 17 and further comprising, after said call has been placed, the steps of:
   monitoring said call for a call blocking message; and
   if said call blocking message is detected then adding said trunk to said list of blocked trunks.

19. The method of claim 18 and further comprising the step of:
   if said call blocking message is detected then marking said record to indicate that said call blocking feature has been encountered with respect to said telephone number.

20. The method of claim 18 and further comprising the steps of:
   if call blocking message is detected then:
   inspecting said records to determine if said call blocking feature has previously been encountered with respect to said telephone number; and if said call blocking feature has not previously been encountered with respect to said telephone number then marking said record to indicate that said call blocking feature has been encountered with respect to said telephone number.

21. The method of 17 and further comprising the steps of:
inspecting said list to determine if all trunks of said plurality of trunks are on said list; and
if all said trunks are on said list then notifying an operator that all said trunks have been blocked.

22. The method of 17 and further comprising the steps of:
inspecting said list to determine if all trunks of said plurality of trunks are on said list; and
if all said trunks are on said list then marking a log to indicate that all said trunks were blocked with respect to said telephone number.

23. The method of claim 17 and further comprising, after said call has been placed, the steps of:
(g) if a busy signal is detected on said trunk then terminating said call;
(h) if an operator is not projected to be available within a first predetermined time after said call was placed then terminating said call;
(i) if said call has not been answered within a second predetermined time after said call was placed then terminating said call;
(j) if said call is answered and an operator is not available then terminating said call; and
(k) if said call is answered and an operator is available then connecting said call to said operator.

24. The method of claim 23 wherein steps (g), (h), and (i) further comprise marking a record to indicate that said telephone number is to be called again.

25. The method of claim 23 wherein step (j) further comprises marking a record to indicate that said telephone number is to be called again.

26. The method of claim 23 wherein step (j) further comprises marking a record to indicate that said telephone number is to be called again after a predetermined time.

27. The method of claim 23 wherein step (j) further comprises marking a record to indicate that said telephone number is to be called again as soon as an operator is available.

28. The method of claim 23 wherein step (j) further comprises marking a record to indicate that said telephone number is to be called again as soon as an operator is projected to become available.

29. The method of claim 23 wherein said first predetermined time is programmable.

30. The method of claim 23 wherein said second predetermined time is programmable.

31. The method of claim 23 wherein each said step of terminating said call comprises releasing said trunk.

32. The method of claim 23 and further comprising the step of dynamically adjusting said first predetermined time in response to current operating conditions.

33. The method of claim 23 and further comprising the step of dynamically adjusting said second predetermined time in response to current operating conditions.

34. The method of claim 17 and further comprising, after said call has been placed, the steps of:
(g) if a busy signal is detected on said trunk then terminating said call;
(h) if an operator is not projected to be available within a first predetermined time after said call was placed then terminating said call;
(i) if said call has not been answered within a second predetermined time after said call was placed then terminating said call;
(j) if said call is answered and an operator is not available then playing a predetermined message; and
(k) if said call is answered and an operator is available then connecting said call to said operator.

35. The method of claim 34 wherein steps (g), (h), and (i) further comprise marking a record to indicate that said telephone number is to be called again.

36. The method of claim 34 wherein step (j) further comprises marking a record to indicate that said telephone number is to be called again if an operator is not available after a predetermined period.

37. The method of claim 34 wherein step (j) further comprises marking a record to indicate that said telephone number is to be called again after a third predetermined time if an operator is not available after a predetermined period.

38. The method of claim 34 wherein step (j) further comprises marking a record to indicate that said telephone number is to be called again as soon as an operator is available if an operator is not available after a predetermined period.

39. The method of claim 34 wherein said first predetermined time is programmable.

40. The method of claim 34 wherein said second predetermined time is programmable.

41. The method of claim 34 wherein each said step of terminating said call comprises releasing said trunk.

42. The method of claim 34 and further comprising the step of dynamically adjusting said first predetermined time in response to current operating conditions.

43. The method of claim 34 and further comprising the step of dynamically adjusting said second predetermined time in response to current operating conditions.

44. For use with an automated call dialing system, a method for avoiding a call blocking feature, comprising the steps of:
(a) obtaining a telephone number to be called;
(b) inspecting a record to determine if said call blocking feature has previously been encountered with respect to said telephone number;
(c) if said call blocking feature has not previously been encountered with respect to said telephone number then seizing an available trunk of a plurality of trunks and placing a call by dialing said telephone number on said trunk;
(d) if said call blocking feature has previously been encountered with respect to said telephone number then inspecting a blocked trunk list to determined whether an available trunk is on said blocked trunk list; and
(e) if an available trunk is not on said blocked trunk list then seizing said available trunk and placing a call by dialing said telephone number on said available trunk.

45. The method of claim 44 and further comprising the step of:
(f) if all available trunks are on said blocked trunk list then making a record to indicate that said telephone number is to be called again.

46. The method of claim 44 wherein step (f) comprises the steps of:

if all available trunks are on said blocked trunk list for at least a first predetermined time then marking said record to indicate that said telephone number is to be called again; and if a trunk not on said blocked trunk list becomes available within said first predetermined time then seizing said trunk and placing a call by dialing said telephone number on said trunk.

47. The method of 44 and further comprising the steps of:

inspecting said list to determine if all trunks of said plurality of trunks are on said list; and if all said trunks are on said list then notifying an operator that all said trunks have been blocked.

48. The method of 44 and further comprising the steps of:

inspecting said list to determine if all trunks of said plurality of trunks are on said list; and if all said trunks are on said list then marking a log to indicate that all said trunks were blocked with respect to said telephone number.

49. The method of 44 and further comprising, after said call has been placed, the steps of:

monitoring said call for a call blocking message; and if said call blocking message is detected then adding said trunk to said list of blocked trunks.

50. The method of claim 49 and further comprising the step of:

if said call blocking message is detected then marking said record to indicate that said call blocking feature has been encountered with respect to said telephone number.

51. The method of claim 49 and further comprising the steps of:

if said call blocking message is detected then:

inspecting said records to determine if said call blocking feature has previously been encountered with respect to said telephone number; and if said call blocking feature has not previously been encountered with respect to said telephone number then marking said record to indicate that said call blocking feature has been encountered with respect to said telephone number.

52. The method of claim 41 and further comprising, after said call has been placed, the steps of:

(f) if a busy signal is detected on said trunk then terminating said call;

(g) if an operator is not projected to be available within a first predetermined time after said call was placed then terminating said call;

(h) if said call has not been answered within a second predetermined time after said call was placed then terminating said call;

(i) if said call is answered and an operator is not available then terminating said call; and (j) if said call is answered and an operator is available then connecting said call to said operator.

53. The method of claim 52 wherein steps (f), (g), and (h) further comprise marking a record to indicate that said telephone number is to be called again.

54. The method of claim 52 wherein step (i) further comprises marking a record to indicate that said telephone number is to be called again.

55. The method of claim 52 wherein step (i) further comprises marking a record to indicate that said telephone number is to be called again after a predetermined time.

56. The method of claim 52 wherein step (i) further comprises marking a record to indicate that said telephone number is to be called again as soon as an operator is available.

57. The method of claim 52 wherein step (i) further comprises marking a record to indicate that said telephone number is to be called again as soon as an operator is projected to become available.

58. The method of claim 52 wherein said first predetermined time is programmable.

59. The method of claim 52 wherein said second predetermined time is programmable.

60. The method of claim 52 wherein each said step of terminating said call comprises releasing said trunk.

61. The method of claim 52 and further comprising the step of dynamically adjusting said first predetermined time in response to current operating conditions.

62. The method of claim 52 and further comprising the step of dynamically adjusting said second predetermined time in response to current operating conditions.

* * * * *